UNITED STATES PATENT OFFICE 2,562,351

BASIC ESTERS OF CHOLANIC AND KETOCHOLANIC ACIDS

Robert R. Burtner, Skokie, Ill., assignor to G. D. Searle & Co., Chicago, Ill., a corporation of Illinois No Drawing. Application March 4, 1949, Serial No. 79,731

14 Claims. (Cl. 260—239.5)

This invention relates to basic esters of cholanic and ketocholanic acids, to salts thereof and to the production of such esters. More particularly this invention relates to esters of the following general structural formula

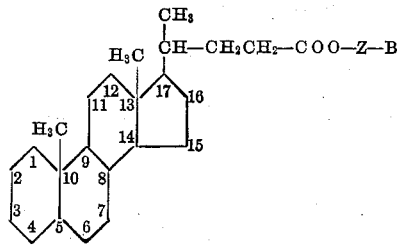

wherein there are not more than two keto groups in the cholanic acid moiety, and wherein Z is a lower alkylene radical and B is an aliphatic-type amino group.

This application is a continuation-in-part of my copending application Serial No. 622,081, filed October 12, 1945.

In the compounds of the foregoing type Z represents a lower alkylene radical, such as ethylene, propylene, 1,3-butylene, 2,3-butylene, or 1,2-butylene, amylene and related bivalent radicals derived from the saturated aliphatic hydrocarbons containing two to five carbon atoms. The amino radical B represents aliphatic-type amino radicals derived from primary and secondary organic amines having ionization constants in the range of $10^{-3}$ to $10^{-5}$. B therefore includes monalkylamino radicals and dialkylamino radicals wherein the alkyl groups may be the same or different and may contain from one to six carbon atoms. B also includes aliphatic-type cyclic amino radicals, such as piperidino, pyrrolidino, morpholino, and thiamorpholino, as well as alkyl derivatives of such cyclic amino radicals, including 2-methylpiperidino, 2-methylpyrrolidino, 2-ethylpiperidino, 2-methylmorpholino, lupetidino and the like.

These esters may be obtained as viscous oils or glassy masses which are insoluble in water but readily soluble in a variety of organic solvents, or these oily or glassy basic esters may be converted into salts, which are generally crystalline, by neutralization with an equivalent quantity of any convenient non-toxic organic or inorganic acid. Among such acids are hydrochloric, hydrobromic, sulfuric, sulphamic, phosphoric, boric, tartaric, citric, cinnamic, ascorbic, lactic, maleic, acetic, malic, succinic and the like. Salts are in general soluble in water and since they manifest all of the advantages of the esters as disclosed herein, they constitute a preferred form for preparing and using these compounds. Though I have found the hydrochloride salts convenient to prepare and use, it will be understood that other salts may be employed and that the esters described in the appended claims may be in the form of the free base or any of its salts.

The cholanic and ketocholanic acids from which these esters are produced are well known in the prior art. Certain of the keto acids may be isolated from mammalian bile or may be prepared from the corresponding hydroxy cholanic acids by oxidation. Cholanic acid can be obtained by dehydration of the bile acids, followed by catalytic hydrogenation.

The esters of this invention and their salts are conveniently prepared by heating a mixture of the acid with an aminoalkyl halide in an organic solvent, such as isopropanol, acetone, methyl ethyl ketone, and the like. During this reaction the hydrohalide salt of the basic ester is formed. In certain instances this is obtained as a crystalline precipitate and may be ready isolated and purified. In the cases where the ester salt is not a crystalline precipitate it may be isolated by evaporation of the solvent, extraction of the residue with acid, neutralization of the acid extract, extraction with an organic solvent such as benzene, and then evaporation of the solvent to afford the basic ester. These basic esters may be converted to acid salts by treatment with an acid of the type discussed hereinabove and may be converted to quaternary ammonium salts by reaction with a reactive ester such as an alkyl halide or sulfate.

The products of this invention are useful as medicinal agents. They have favorable effects on fibrositis and certain types or arthritis. Certain of them appear to produce a synergistic effect when administered with vaccines. The compounds furthermore are useful as spasmolytic agents for relaxing smooth muscle tissue in general. Generally speaking, they are capable of relaxing smooth muscle spasms either neurotropic or musculotropic in origin. They appear to be effective in various kinds of smooth muscle, as typified conveniently by intestinal and uterine strips. The potency of the individual compounds of this invention naturally varies from one to another, but the more potent species approach in quantitative activity the levels reported for some of the widely used natural and synthetic spasmolytic agents. For example, diethylaminoethyl dehydrodesoxycholate hydrochloride (a preferred compound of this invention) is approximately as effective as diethylaminoethyl fluoro-9-carboxylate hydrochloride (a synthetic spasmolytic agent widely used in this country under the trade-name "Pavatrine" and described and claimed by me in United States Letters Patent No. 2,262,754, dated November 18, 1941) in relaxing spasms of intestinal strips caused by barium ions (considered to be typical of musculotropic spasms). It is but slightly less potent than the same reference compound in relaxing intestinal spasms induced by acetylcholine (considered to be typical of neurotropic spasms). Its toxicity on intraperitoneal adminstration (in mice) is about the same as the reference compound, but it is appreciably less toxic on oral administration. Likewise diethylaminoethyl desoxycholate hydrochloride is but a little less potent than the corresponding dehydrodesoxycholate as described above, though it is slightly more toxic than that compound.

As shown above, these compounds are useful as spasmolytic agents for relaxing smooth muscle tissue in general. However, the compounds of this invention are unique among all spasmolytic agents in that they possess the bile acid structure as the major portion of their molecule. It is well known that bile acids and their common derivatives are selectively secreted and concentrated into the bile. Consequently, the compounds described and claimed herein are of peculiar and unique interest in spastic states involving the gall bladder and other structures through which bile is secreted and passed.

My invention is disclosed in detail by the following examples which are provided solely for the purpose of illustration and which are in no way intended to limit the invention in spirit and in scope.

*Example 1*

To a suspension of 18.7 grams of dehydrolithocholic (3-ketocholanic) acid in 75 cubic centimeters of warm isopropanol are added 7 g. of β-diethylaminoethyl chloride. The mixture is refluxed for 2 hours and then stripped of solvent under vacuum. The viscous residue is poured into 1 liter of 0.4% sodium hydroxide solution. The basic ester which separates is extracted with benzene. The benzene extract is washed with water, dried and partially evaporated. The benzene solution remaining is filtered and then treated with an equivalent of anhydrous hydrogen chloride in absolute alcohol. The precipitate of β-diethylaminoethyl dehydrolithocholate is removed, washed with benzene, and dried in vacuum. It can be purified by crystallization from methyl ethyl ketone. The salt thus obtained is moderately soluble in water.

*Example 2*

217 grams of dehydrodesoxycholic (3,12-diketocholanic) acid and 81.3 g. of β-diethylaminoethyl chloride are refluxed together in 660 cc. of isopropanol, and the oily ester base precipitated from water and extracted with benzene as described in Example 1. Much of the benzene is removed from the extract by distillation, and a solution containing one equivalent of hydrogen chloride in anhydrous ethanol is added. The resulting solution is cooled and poured slowly into 4750 cc. of ether during vigorous stirring. The precipitate soon granulates, and is filtered, washed with fresh ether, and dried in a vacuum over sodium hydroxide. The β-diethylaminoethyl dehydrodesoxycholate hydrochloride thus obtained may be purified by crystallization from methyl ethyl ketone, and when so purified melts at approximately 187° centigrade. It is readily soluble in water and alcohol, and sufficiently hygroscopic to render determination of the melting point uncertain.

Operating in a similar manner, the β-piperidinoethyl, β-dimethylaminoethyl, β-diethylaminopropyl and γ-diethylaminopropyl esters of dehydrodesoxycholic acid may be obtained as hydrochlorides which are similarly hygroscopic, readily soluble in water, and frequently difficult to crystallize satisfactorily.

*Example 3*

A warm solution of 38.9 g. of dehydrodesoxycholic acid in 150 cc. of isopropanol is refluxed for 3 hours with 12 g. of β-dimethylaminoethyl chloride. The solvent is then removed in vacuum and the residue poured into 2 liters of 0.5% sodium hydroxide solution. The aqueous suspension is extracted thoroughly with benzene. The benzene extract is washed with water and dried. It is filtered and then treated with a small excess of anhydrous hydrogen chloride in absolute alcohol. The mixture is diluted with dry ether and chilled. The precipitate of β-dimethylaminoethyl dehydrodesoxycholate hydrochloride is removed and dried in vacuum. It is readily soluble in water and in alcohol.

*Example 4*

By substituting 15 g. of β-piperidinoethyl chloride for the β-dimethylaminoethyl chloride in Example 3, β-piperidinoethyl dehydrodesoxycholate and its hydrochloride may be obtained. These substances have physical properties closely resembling those of β-diethylaminoethyl dehydrodesoxycholate and its hydrochloride.

*Example 5*

12 g. of cholanic acid in 50 cc. of hot isopropanol are refluxed for 3 hours with 4.5 g. of β-diethylaminoethyl chloride. The hot solution is filtered and then thoroughly chilled. The white crystals of β-diethylaminoethyl cholanate hydrochloride are removed. They may be further purified by recrystallization from isopropanol. The purified salt melts at about 200° C. It is not hygroscopic as are many of the salts of this application, and it is but moderately soluble in water.

*Example 6*

A solution of 19.4 g. of dehydrodesoxycholic acid in 70 cc. of hot isopropanol is refluxed for 3 hours with 8 g. of β-diethylaminopropyl chloride. The basic ester is isolated by benzene extraction as in Example 3. It may be obtained from the benzene extract by evaporation in vacuum. It is a viscous oily material which is readily soluble in dilute hydrochloric acid.

*Example 7*

25.3 g. dehydrohyodesoxycholic (3,6-diketocholanic) acid and 9.6 g. of β-diethylaminoethyl chloride in 80 cc. of warm isopropanol are refluxed for 3 hours. The hot solution is filtered and then evaporated under vacuum. The residue is treated with 500 cc. of 1% sodium hydroxide solution to precipitate the basic ester. The mixture is extracted thrice with 75 cc. portions of benzene and the combined extracts are washed with water and dried. 200 cc. of benzene are removed by distillation and the residual benzene solution is chilled and reacted with an equivalent of anhydrous alcoholic hydrogen chloride. The resulting solution is added slowly with stirring to 900 cc. of anhydrous ether. The precipitate of β-diethylaminoethyl dehydrohyodesoxycholate hydrochloride is collected on a filter, washed with ether and dried in vacuum over fused sodium hydroxide. The salt is recrystallized from 70 cc. of methyl ethyl ketone and forms hygroscopic white crystals. A melting point could not be determined due to hygroscopicity. By drying at 100° C. and 0.5 mm. pressure, the anhydrous salt may be obtained.

*Example 8*

A solution of 19.4 g. of dehydrohyodesoxycholic acid and 15 g. of β-dibutylaminoethyl chloride in 70 cc. of hot isopropanol is refluxed for 3 hours. The solvent is then removed by evaporation under vacuum and the viscous residue of crude β-dibutylaminoethyl dehydrohyodesoxycholate hydrochloride is dissolved in 1% hydrochloric acid and the resulting solution is filtered and then made alkaline. β-Dibutylaminoethyl dehydrohyodesoxycholate is separated from the aqueous solution by extraction with benzene. The benzene solution is washed with water and dried. On evaporation under vacuum there is obtained β-dibutylaminoethyl dehydrohyodesoxycholate, which is a light colored oil which is soluble in dilute hydrochloric acid.

*Example 9*

20 g. of dehydrodesoxycholic acid and 8 g. of β-morpholinoethyl chloride are reacted in 80 cc. of isopropanol by the method of Example 3. The organic base is isolated by the procedure of Example 8. β-Morpholinoethyl dehydrodesoxycholate is a light colored oil which is soluble in dilute hydrochloric acid.

*Example 10*

A suspension of 1.94 g. of dehydrochenodesoxycholic (3,7-diketocholanic) acid in 10 cc. of warm isopropanol is refluxed for 3 hours with 0.68 g. β-diethylaminoethyl chloride. The solvent is stripped off under vacuum and the viscous residue of crude β-diethylaminoethyl dehydrochenodesoxycholate is agitated with a cold solution of 0.5% sodium hydroxide. The alkaline suspension is extracted with benzene and the benzene extract is washed with water and dried. The benzene is removed under vacuum and β-diethylaminoethyl dehydrochenodesoxycholate is isolated as a light-colored viscous oil.

I claim:

1. As a new composition of matter, an amino-lower-alkyl ester of a cholanic acid which contains not more than two keto substituents and which is devoid of hydroxyl substituents, and acid addition salts thereof, wherein the amino substituent is selected from the group consisting of di(lower alkyl)amino, piperidino, pyrrolidino and morpholino radicals.

2. As a new composition of matter, an acid addition salt of a di(lower alkyl)amino-lower-alkyl ester of a cholanic acid which contains not more than two keto substituents and which is devoid of hydroxyl substituents.

3. As new compositions of matter, acid addition salts of a di(lower-alkyl)amino-lower-alkyl ester of dehydrodesoxycholic acid.

4. As new compositions of matter, said addition salts of a di(lower-alkyl)aminoethyl ester of dehydrodesoxycholic acid.

5. As new compositions of matter, acid addition salts of β-diethylaminoethyl dehydrodesoxycholate.

6. β-Diethylaminoethyl dehydrodesoxycholate hydrochloride.

7. As a new composition of matter, an acid addition salt of a piperidino-lower-alkyl ester of a cholanic acid which contains not more than two keto substituents and which is devoid of hydroxyl substituents.

8. As a new composition of matter, an acid addition salt of a morpholino-lower-alkyl ester of a cholanic acid which contains not more than two keto substituents and which is devoid of hydroxyl substituents.

9. As new compositions of matter, acid addition salts of β-piperidinoethyl dehydrodesoxycholate.

10. β-Piperidinoethyl dehydrodesoxycholate hydrochloride.

11. As new compositions of matter, acid addition salts of di(lower-alkyl)amino-lower-alkyl ester of dehydrohyodesoxycholic acid.

12. As new compositions of matter, acid addition salts of di(lower-alkyl)aminoethyl ester of dehydrohyodesoxycholic acid.

13. As new compositions of matter, acid addition salts of β-diethylaminoethyl dehydrohyodesoxycholate.

14. β-diethylaminoethyl dehydrohyodesoxycholate hydrochloride.

ROBERT R. BURTNER.

REFERENCES CITED

The following references are of record in the file of this patent:

UNITED STATES PATENTS

| Number | Name | Date |
|---|---|---|
| 1,677,554 | Gams et al. | July 17, 1928 |
| 1,933,003 | Boedecker | Oct. 31, 1933 |
| 2,023,075 | Harris | Dec. 3, 1935 |
| 2,296,677 | Kussner | Sept. 22, 1942 |
| 2,313,016 | Horenstein et al. | Mar. 2, 1943 |
| 2,337,563 | Macker | Dec. 28, 1943 |
| 2,456,363 | Bergel et al. | Dec. 14, 1948 |

Certificate of Correction

Patent No. 2,562,351 July 31, 1951

ROBERT R. BURTNER

It is hereby certified that error appears in the printed specification of the above numbered patent requiring correction as follows:

Column 2, line 24, for "ready" read *readily*; line 39, for "types or" read *types of*; column 3, line 3, for "fluoro-9-carboxylate" read *fluorene-9-carboxylate*; column 6, line 12, for "said" read *acid*;

and that the said Letters Patent should be read as corrected above, so that the same may conform to the record of the case in the Patent Office.

Signed and sealed this 25th day of December, A. D. 1951.

[SEAL]

THOMAS F. MURPHY,
*Assistant Commissioner of Patents.*